Figure 1:
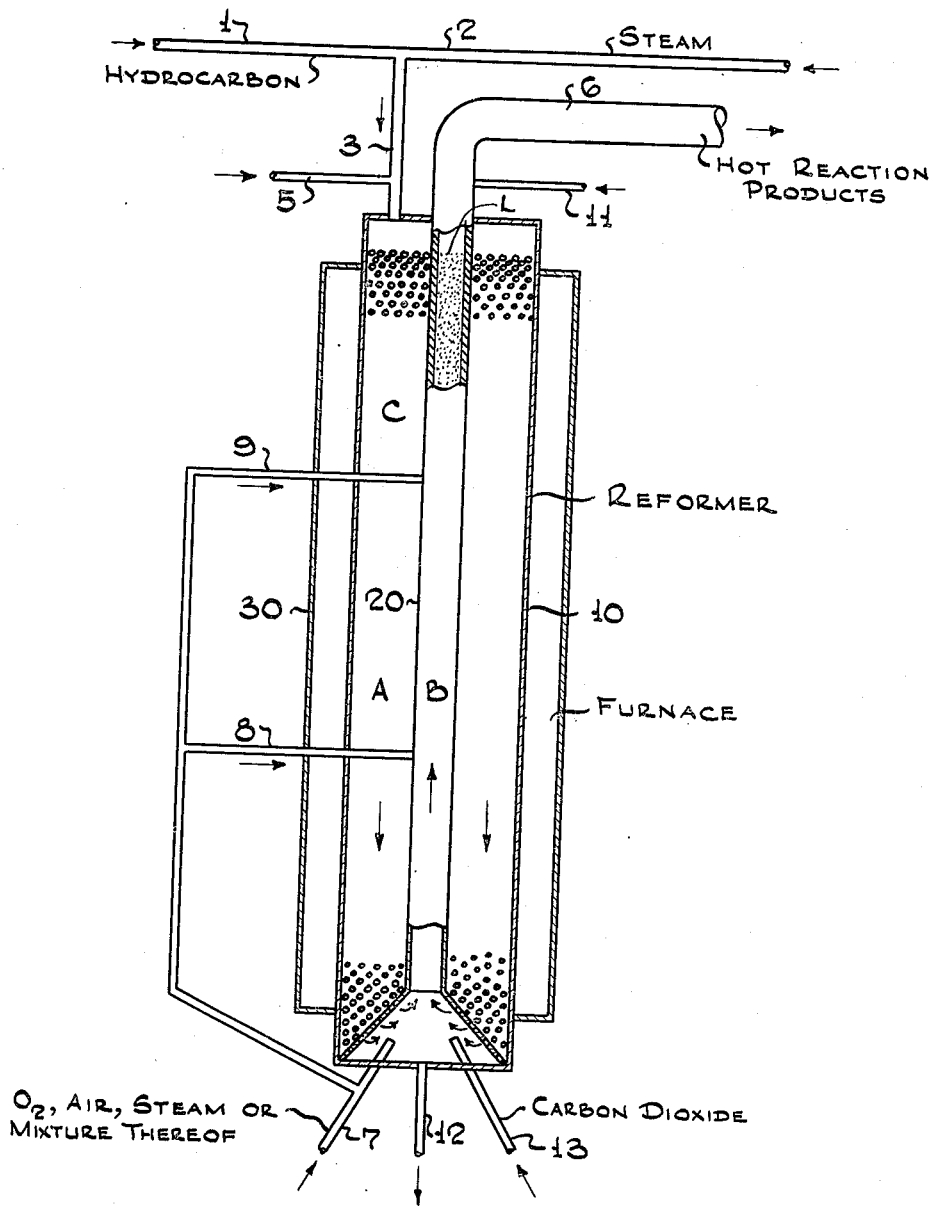

Jan. 25, 1955  W. W. ODELL  2,700,598
PROCESS FOR REFORMING HYDROCARBONS
Filed Oct. 31, 1946  2 Sheets-Sheet 2

William W. Odell Inventor
By P. J. Whelan Attorney

United States Patent Office 2,700,598
Patented Jan. 25, 1955

2,700,598

PROCESS FOR REFORMING HYDROCARBONS

William W. Odell, Washington, D. C., assignor to Standard Oil Development Company, a corporation of Delaware Application October 31, 1946, Serial No. 707,023

9 Claims. (Cl. 48—196)

The present invention relates to an improved process and apparatus for the reforming of gaseous hydrocarbons or hydrogen and carbon containing compounds. The invention is more specifically concerned with an improved process for the reforming of hydrocarbons in which the hydrocarbons are introduced into one end of a vertically packed column, passed longitudinally through the column and then passed countercurrently longitudinally within said column through a centrally and axially disposed inner tube within the column.

In accordance with a preferred modification of my invention, small amounts of a combustion-supporting gas are introduced at predetermined points within the column. Furthermore, in accordance with a preferred modification of my invention, a combination of fluidized and nonfluidized solid packings is employed to aid the transfer of heat. A particularly desirable adaptation of my process is to employ fluidized reforming catalyst in the annular space and no packing or nonfluidized packing in the inner tube. The complete scope and objects of my invention may be readily and fully understood by the hereinafter description.

It is well known in the art to reform hydrocarbons, particularly gaseous hydrocarbon or hydrogen and carbon containing compounds which can be readily handled in the vapor phase. By reforming is meant promoting the reaction of the hydrocarbon compound with an oxidizing medium which may comprise steam, carbon dioxide, oxygen, air, mixtures of these or other oxidizing fluids.

Primarily, reforming relates to the reactions of compounds containing carbon and hydrogen with steam, carbon dioxide, a gas containing free oxygen or combinations of these three reactants. Reforming in one specific sense is concerned with the production of combustible gas which may comprise largely a mixture of hydrogen and carbon monoxide in predetermined proportions. Reforming, however, may comprise the preparation of other mixtures, as for example, mixtures comprising nitrogen with carbon monoxide and hydrogen or methane, hydrogen and carbon monoxide or other mixtures.

In known reforming reactions, hydrocarbons comprising methane for example are contacted with steam at elevated temperatures in the range from about 1700° F. to about 2400° F. In these reactions the steam and the hydrocarbons are contacted with a suitable reforming catalyst, as for example one containing active, reduced nickel oxide, or active cobalt or other catalyst known to be suitable while passing steam and the hydrocarbons through externally heated tubes. While these processes have been entirely satisfactory, certain inherent disadvantages and limitations are present. For example, the gas-making capacities have been restricted due to the limitations of the temperature to which a metal can be safely heated. Furthermore, in a packed tube reactor gasmaking capacities have been restricted due to the size of pipe or tube which can be employed without securing the formation of a relatively cool dead center-area therein.

I have now discovered an improved process and apparatus for reforming hydrocarbons and other hydrogen and carbon containing compounds which process overcomes these inherent disadvantages present in equipment now employed. My process also produces further and additional benefits. My invention is concerned with the use of a tubular reactor of a particular kind and design which may be filled entirely or in part with solid catalytic material or which may be filled with solid heat conductors, according to the effect desired. In accordance with my process, the hydrocarbons to be reformed are introduced along with the oxidizing fluid, as for example steam, into one end of a vertically packed catalytic column so disposed in a furnace that it can be readily heated by external means. The vertically packed catalyst may be either in the fluidized or nonfluidized state. Also, in accordance with a preferred modification of my invention, I prefer to introduce with the hydrocarbons and oxidizing fluid, a small amount of a combustion supporting fluid.

In accordance with my process, I apply heat to the outer surface of said column as I pass a stream initially containing the hydrocarbons and oxidizing fluid either upwardly or downwardly through the column. If the process comprises initially passing hydrocarbons downwardly through the column, I then pass the reaction gases upwardly countercurrently within the column through a centrally and axially disposed inner tube zone. In accordance with a preferred adaptation of my invention, I maintain packing either in the fluidized or nonfluidized state in the inner tube zone within the column. Also in accordance with preferred adaptations of my invention, I introduce predetermined amounts of combustion supporting gases into the reaction vapors within the inner tube zone in the column, preferably at a plurality of introduction points, thereby supplying heat within this inner zone. In accordance with a specific embodiment, I also introduce into the inner tube zone an amount of carbon dioxide which amount may vary from zero upwardly.

Figure 2:
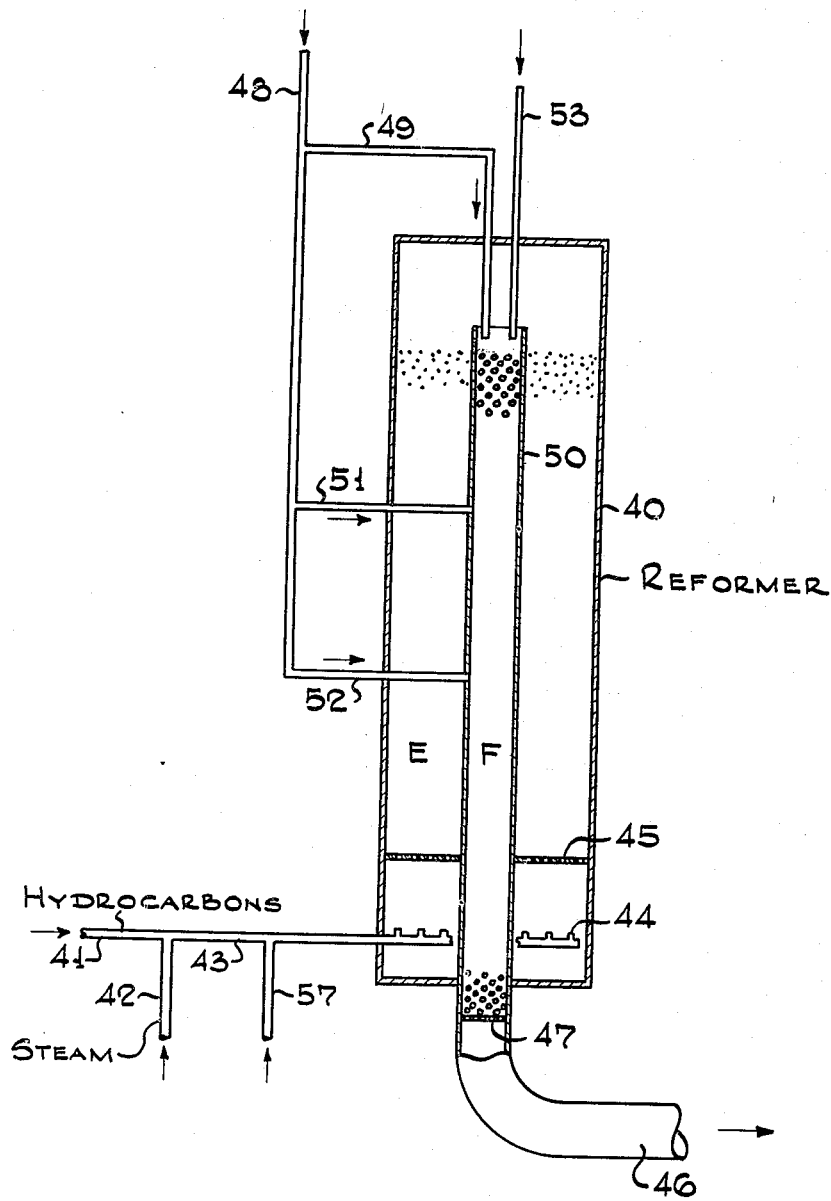

My invention may be more readily understood by reference to the attached drawings illustrating embodiments and adaptations of the same. Although the drawings are described with respect to a single stage, it is to be understood that the invention may be readily applied to an operation wherein a plurality of stages are utilized. Fig. 1 illustrates a schematic embodiment of my invention wherein the feed gases are introduced into the top of the tubular reforming apparatus, while Fig. 2 illustrates a schematic embodiment of my invention wherein the feed gases comprising hydrocarbons are introduced into the bottom of the tubular reforming apparatus.

Referring specifically to Fig. 1, at least one hydrocarbon or a hydrogen and carbon-containing compound and steam or other oxidizing fluid are introduced into the reformer 10 by means of conduits 1, 2, and 3. Reformer 10 comprises a tubular reactor containing axially disposed therein an inner tube zone 20. The hydrocarbons and steam introduced into the top of reformer zone 10 pass downwardly through annular zones C and A between inner tube zone 20 and the wall of reformer 10. Zones C and A are packed with a suitable reforming catalyst preferably throughout their entire length, with the exception as hereinafter described. The outer wall of reformer 10 may be heated to any desired temperature by heating means 30, which for the purpose of description is shown as an outer furnace jacket completely encircling the reforming zone. It is to be understood, however, that any suitable means of heating the outer wall of reformer 10 may be employed.

The stream initially containing feed gases flows downwardly through the packed catalyst in zones C and A to the bottom of reformer 10. The gases then flow upwardly through inner zone B within inner tube 20. In accordance with a preferred adaptation of my invention, I introduce with the feed gases small predetermined amounts of combustion supporting materials by means of conduit 5. If this procedure be not followed, the upper zone C of the bed of catalytic material in reformer 10 is substantially nothing more than a heat exchanger zone even though the hydrocarbons and steam admitted through line 3 are preheated as high as 800° F., since the reforming reaction does not occur appreciably until the temperature of the feed gases approaches above about 1400° F.

The reaction products which flow upwardly through zone B are withdrawn from the reforming zone by means of conduit 6 and handled in any manner desirable. These gases, for example, are particularly adapted for hydrocarbon synthesis reactions. Also, in accordance with a preferred embodiment of my invention, I introduce into inner tube zone 20 an oxidizing fluid, as for example, oxygen, air, steam or mixtures thereof by means of conduit 7. Although one point of introduction of these materials may be employed, I may introduce the latter combustion-supporting materials at a plurality of points by means of conduits 8 and 9. It is to be understood that other points of introduction of the combustion-supporting material into zone B may be employed.

By intorducing oxygen, air or steam by means of conduit 7 an additional amount of gas is produced. Furthermore, it is thereby possible to raise the temperature of the reaction gases to about 1700° F. to 2400° F. and higher. It is sometimes desirable to introduce also a predetermined amount of carbon dioxide by means of line 13 in order to control the hydrogen to carbon monoxide ratio.

In accordance with a preferred embodiment of my invention, I employ a fluidized solid packing material in the upflow zone B in order to facilitate transfer of heat from the hot upflowing gases to the walls of tube 20 and ultimately into the catalytic material or other solids in the annular space between 10 and 20. Suitable packing material for fluidizing in B is for example, silica, alumina, crushed refractory materials, silicon carbide, silicon and the like.

This solid fluidized packing material preferably has a particle size in the range from about 20 to 200 microns and greater. These particles are fluidized within zone B as a bed having an upper level or interface L, which may be at about the same level as the top of the fixed bed of particles in the annular reaction zone C. The particles are suspended in the fluidized ebullient state by means of upflowing gases, the velocity of which is in the range from about 0.5 to 5 feet per second and higher. In zone B I may also employ a combination of packing, some of which is in the fluidized state, while the remainder comprises nonfluidized solid packing. As satisfactory materials for nonfluidized packing in B may be high melting point metals, chromium oxide, chromite or carborundum and the like. Fluidized packing is then maintained in the fluid state by means of the upflowing suspending gases flowing between the interstices of the solid nonfluidized packing.

Any suitable means may be employed for introducing the packing into zone B and withdrawing the same. For example, the packing may be introduced into zone B prior to the start of the operation by means of conduit 11 or the packing may be introduced by means of conduit 11 and withdrawn by means of conduit 12, continuously during the operation. In general, I prefer to introduce the fluidized packing prior to the start of the operation and not to withdraw or introduce additional fluidized packing during the course of the operation other than as may be required to maintain a sufficient supply in zone B.

Referring specifically to Fig. 2, feed gases comprising hydrocarbon constituents and an oxidizing fluid, as for example steam are introduced into reformer 40 by means of conduits 41, 42 and 43 and distributing means 44. These gases flow upwardly as a stream in the annular zone E between the walls of reformer 40 and an inner axially disposed tube 50. The upflow zone E contains a fluidized solid packing, preferably fluidized catalytic material, held on pervious supports 45 and maintained in the fluidized state by means of the upflowing gases. The solids in E may comprise nickel, cobalt, or other material known to catalyze reforming reactions. The fluidized particles generally have particle sizes in the range from about 20 to 200 microns and larger. The gas stream from E passes downwardly through zone F within inner tube 50 and is withdrawn from the system by means of conduit 46. In this adaptation of my invention, zone F is preferably packed with catalytic stationary packing positioned on supports 47. Oxygen or other combustion supporting material may be introduced with the feed hydrocarbons by means of conduit 57. In a manner similar to that described with respect to Fig. 1 the outer wall of reformer 40 may be heated by any suitable means. Also in a manner similar to that described with respect to Fig. 1, a combustion supporting gas may be introduced into zone F by means of conduit 48, 49, 51 and 52. Carbon dioxide may be introduced into zone F by means of conduit 53 as described in Fig. 1.

A combination column reactor of the type of my invention eliminates the relatively cool dead center-portion commonly present in the use of large diameter tubes such as 10 or 12 inch diameter tubes. It also provides extra wall heating effect in the reformer. It should be noted, in comparing the volume-surface relationships relating to different sized tubes such as a 6-inch tube and a 12-inch tube, that the following data apply (comparing a 6-inch tube with a 12-inch tube having a 6-inch inner tube): In each case the thickness of the bed to be heated is 3 inches from the outer wall to the innermost portion. In the 6-inch tube this is accomplished entirely by heat applied to the external wall. In a 12-inch tube of my invention heat is applied over the outer surface and also on the inner tube wall. The volume of three 6-inch tubes is equivalent to the volume of the annular space in the 12-inch tube and the total heating surface of three 6-inch tubes is substantially equal to the total heat surface provided in the 12" combination. The thickness of the bed of solids which must be heated from the wall is less in the 12" tube than in the 6" tube.

My invention is particularly directed to an improved process and apparatus therefor, for conducting operations wherein it is necessary to heat solid particles. Although, my process and apparatus may be used for any process involving the contacting of gases and solids, it is particularly adapted to reforming operations wherein hydrocarbons are reacted with steam for the production of gases suitable for hydrocarbon synthesis reactions.

The process of my invention is not to be limited by any theory as to mode of operation, but only in and by the following claims in which it is desired to claim all novelty insofar as the prior art permits.

I claim:

1. The improved process for promoting chemical reactions in a gasiform fluid which comprises introducing a stream of said fluid at one end of a deep bed of solid particles confined in an upright reaction zone, simultaneously applying heat to the external surface of said zone to heat said solid particles and thereby causing substances in said fluid to react chemically during their passage in a vertical direction therethrough, removing a gasiform fluid stream containing hot primary reaction products from the other end of said bed of solid and passing it longitudinally in the reverse vertical direction through a secondary reaction zone extending through and in indirect heat exchange relationship with said bed of solid in the primary reaction zone, maintaining a confined fluidized bed of solid particles in ebullient motion within the zone through which said fluids pass upwardly to maintain a substantially uniform temperature therein and to improve the transfer of heat between said zones, and thereby improving the uniformity of the temperature distribution within the primary reaction zone.

2. The process according to claim 1 wherein additional heat is supplied directly to the second reaction zone and indirectly therefrom to the primary reaction zone by injecting an oxygen-containing gas into said secondary zone to support a combustion reaction releasing heat therein.

3. The process as defined by claim 1 wherein said gasiform fluid comprises a reactant mixture containing methane and steam, and wherein the solids in said primary reaction zone comprise reforming catalysts.

4. The process as defined by claim 1 wherein said vapors comprise hydrocarbons containing methane and steam, introduced upwardly into the primary reaction zone containing a fluidized bed of reforming catalyst particles, and wherein the secondary reaction zone contains a nonfluidized bed of noncatalytic solids.

5. The process as defined by claim 1 wherein said vapors comprise hydrocarbons containing methane and steam, introduced downwardly into said primary zone containing nonfluidized particles of reforming catalyst, and wherein a fluidized bed of noncatalytic solid particles is maintained in the secondary reaction zone.

6. In a process for contacting vapors and solids employing an externally heated and vertically disposed tubular reactor having an outer annular reaction zone and an inner tube reaction zone, the improvement which comprises first introducing vapors to be reacted into one end of said annular zone and contacting said vapors therein with a confined bed of solid particles while simultaneously supplying heat to the reaction through the external wall of said reaction zone, passing said vapors longitudinally in a vertical direction through said zone and withdrawing from the other end thereof a hot vapor stream containing primary reaction products, passing said stream vertically in the reverse direction through said inner tube reaction zone in contact with a bed of solid particles and in indirect heat exchange relationship with and counterflow to the incoming stream of reactant vapors in the outer annular zone, and maintaining said solid within the reaction zone wherein said vapors flow upwardly as an ebullient bed of fluidized particles held substantially continuously within said zone during the course of the operation.

7. The process as defined by claim 6 wherein said vapors are introduced upwardly into the bottom of the annular reaction zone in said tubular reactor and wherein said solids in said annular zone are maintained in a fluidized state.

8. The process as defined by claim 6 wherein said vapors are introduced downwardly into the top of said tubular reactor, said annular reactor zone contains solids in a nonfluidized state, and said inner tube zone contains a bed of fluidized solids.

9. The process as defined by claim 8 wherein said vapors comprise a reactant mixture of hyrdocarbons containing methane and steam introduced downwardly into the reactor, said solids in the annular reaction zone comprise a fixed bed of reforming catalysts, a fluidized bed of noncatalytic solid particles is maintained within the inner tube zone, and a combustion-supporting gas is introduced at a plurality of points in said inner tube zone.

References Cited in the file of this patent

UNITED STATES PATENTS

| | | |
|---|---|---|
| 1,386,760 | Bosch | Aug. 9, 1921 |
| 1,951,774 | Russell et al. | Mar. 20, 1934 |
| 1,960,912 | Larson | May 29, 1934 |
| 1,973,851 | Feiler et al. | Sept. 18, 1934 |
| 1,983,943 | Odell | Dec. 11, 1934 |
| 2,133,496 | Winkler et al. | Oct. 18, 1938 |
| 2,349,439 | Koppers | May 23, 1944 |
| 2,378,342 | Voorhees et al. | June 12, 1945 |
| 2,459,836 | Murphree | Jan. 25, 1949 |
| 2,472,254 | Johnson | June 7, 1949 |

OTHER REFERENCES

Grant: "Hackh's Chemical Dictionary," 3rd edition, page 217.